United States Patent [19]

Summers

[11] 4,078,001
[45] Mar. 7, 1978

[54] N-1,3-DIMETHYLBUTYL-N'-1,4-DIMETHYL-PENTYL-p-PHENYLENEDIAMINE

[75] Inventor: Charles Gene Summers, Medina, Ohio

[73] Assignee: Monsanto Company, St. Louis, Mo.

[21] Appl. No.: 605,611

[22] Filed: Aug. 18, 1975

Related U.S. Application Data

[62] Division of Ser. No. 513,712, Oct. 10, 1974, Pat. No. 3,929,855.

[51] Int. Cl.$^2$ .......................... C07C 87/58; C08G 6/00
[52] U.S. Cl. ............................ 260/577; 260/45.9 QB; 260/814
[58] Field of Search ............................ 260/577; 44/74

[56] References Cited

U.S. PATENT DOCUMENTS

| | | | |
|---|---|---|---|
| 2,779,789 | 1/1957 | Rosenwald et al. | 260/577 |
| 2,867,604 | 1/1959 | Rosenwald et al. | 260/577 X |
| 2,902,466 | 9/1959 | Rosenwald et al. | 260/577 X |
| 2,965,605 | 12/1960 | Reynolds et al. | 260/577 X |
| 2,969,394 | 1/1961 | Chenicek | 260/577 |
| 3,382,296 | 5/1968 | Tenquist et al. | 260/577 X |
| 3,404,087 | 10/1968 | Scoggins et al. | 44/74 X |
| 3,504,032 | 3/1970 | Altwicker | 260/577 |
| 3,645,966 | 2/1972 | Sparks et al. | 260/577 X |

Primary Examiner—Daniel E. Wyman
Assistant Examiner—John J. Doll

[57] ABSTRACT

N-1,3-Dimethylbutyl-N'-1,4-dimethylpentyl-p-phenylenediamine useful for the preservation of rubber.

1 Claim, No Drawings

N-1,3-DIMETHYLBUTYL-N'-1,4-DIMETHYLPENTYL-p-PHENYLENEDIAMINE

This is a division, of application Ser. No. 513,712, filed Oct. 10, 1974, now U.S. Pat. No. 3,929,855.

This invention relates to the unsymmetrical dialkyl-p-phenylenediamine, 1,3-dimethylbutyl-1,4-dimethylpentyl-p-phenylenediamine and to diene elastomer compositions preserved therewith.

BACKGROUND OF THE INVENTION

Certain unsymmetrical dialkyl-p-phenylenediamines are known. For example, certain unsymmetrical dialkyl-p-phenylenediamines in which one alkyl is derived from an aldehyde and the other from a ketone are described in U.S. Pat. No. 3,504,032 and test results described which indicate that they possess antidegradant activity for diene elastomers comparable to that of the symmetrical N,N'-di(sec-alkyl)-p-phenylenediamines having 7 or 8 carbon atoms in each alkyl group which have become widely accepted in the rubber industry. However, reaction with aldehydes is difficult to control and leads to excessive by-product formation. Moreover, the requirements of low volatility and high degree of safety to workmen coming in contact with either the antidegradant or preserved rubber are severely limiting of practically usable antidegradants.

SUMMARY OF THE INVENTION

It has been found that N-1,3-dimethylbutyl-N'-1,4-dimethylpentyl-p-phenylenediamine is a valuable, improved antidegradant for diene elastomers. It imparts unusually high resistance to degradation of diene elastomers by ozone under both static and dynamic conditions. Waxes provide significant protection from ozone under static conditions but antidegradants are required to supplement the static protection and to provide protection under conditions in which the elastomer is strained or continually flexed. The discovery of the new compound and its valuable properties is further significant because it is derived in part from the readily available methyl isobutyl ketone.

DESCRIPTION OF PREFERRED EMBODIMENTS

The new compound is obtainable by condensing methyl isoamyl ketone with p-nitroaniline to form the anil intermediate, reducing the anil to N-1,4-dimethylpentyl-p-nitroaniline and condensing it with methyl isobutyl ketone under conditions for reductive alkylation. To prepare the N-1,4-dimethylpentyl-p-nitroaniline intermediate, 138 parts by weight (1 molecular proportion) of p-nitroaniline, 120 parts by weight (1.05 molecular proportions) of methyl isoamyl ketone, 7 parts by weight of acidic carbon black catalyst (Summers U.S. Pat. No. 3,414,616) and about 175 parts by weight of xylene are charged to a suitable reactor and the mixture heated at refluxing temperature (144°–153° C) for about 2½ hours during which time a portion of the xylene and a little water is removed. There is then added 1 part by weight of salicylic acid and heating continued at refluxing temperature (153° C) for about 8 hours while collecting 15 parts by weight of water. There is then added 100 parts by weight of methyl isoamyl ketone and heating continued at 153° C until a total of 18 parts by weight of water have been removed. The reaction mixture is stripped of solvent, 240 parts by weight of alcohol added and the resulting solution added to a slurry of 28 parts by weight of sodium borohydride ($NaBH_4$) in about 240 parts by weight of ethyl alcohol at 50° C. A solution forms which is stirred for about 3 hours at 30°–50° C, filtered and the solvent removed from the filtrate by distillation. Xylene is added and the xylene solution washed with water and most of the xylene removed in vacuo.

To conduct the next step, 3 molecular proportions (300 parts by weight) of methyl isobutyl ketone, 1 molecular proportion of N-1,4-dimethylpentyl-p-nitroaniline in xylene prepared as described above, 8 parts by weight of 1% platinum on carbon and 8 parts by weight of acidic carbon co-catalyst are charged to a suitable reactor. Reduction of the nitro group is effected at 110° C, 14.06 kg/sq cm hydrogen pressure (200 lbs/sq in). The temperature is then increased to about 140° C and the hydrogen pressure to 28.284 kg/sq cm. After about 2 hours, the pressure is released and the reaction mixture cooled, filtered, water removed from the filtrate by distillation and the residue fractionated in vacuo collecting an amber liquid, b.p. 200°–205° C at 2–3 mm Hg pressure.

In another and preferred embodiment, N-1,3-dimethylbutyl-p-nitroaniline is prepared by condensing p-nitrochlorobenzene with 2-amino-5-methylhexane. Into an autoclave is charged 117 parts by weight (0.75 molecular proportion) of p-nitrochlorobenzene, 258 parts by weight (2.25 molecular proportions) of 2-amino-5-methylhexane and 40 parts by weight (2.25 molecular proportions) of water. The charge is heated at 158°–172° C for about 15 hours at a pressure of 6.79–7.03 kg/sq cm until the p-nitrochlorobenzene has essentially disappeared. The resulting N-1,3-dimethylbutyl-p-nitroaniline is then alkylated as follows:

A hydrogenator is charged with 116 parts by weight (0.5 molecular proportion) of N-1,3-dimethylbutyl-p-nitroaniline, 200 parts by weight (2.0 molecular proportions) of methyl isobutyl ketone, 10 parts by weight of 1% platinum on carbon catalyst (50% wet) and .2 parts by weight of acetic acid. The charge is heated at 100° C under 28.12 kg/sq cm hydrogen pressure for 4 hours, filtered and the filtrate stripped of volatiles by heating to 180° C/5 mm Hg pressure. The residue is distilled collecting N-1,3-dimethylbutyl-N'-1,4-dimethylpentyl-p-phenylenediamine, b.p. 175° C/1 mm Hg pressure.

Rubber ozone resistance data for the product of this invention is illustrated by a method published by Decker and Wise, The Stress Relaxation Method for Measuring Ozone Cracking, *Rubber World*, April 1962, page 66. The equipment comprises an oven serving as an ozone cabinet filled with ozone generating equipment and racks for both static and dynamic testing. Static racks handle stocks at strains of 5, 10, 20, 30 and 40%. The dynamic rack is a reciprocal mechanism which imparts a 25% strain to the rubber test piece on movement of a top plate which moves vertically with respect to a stationary bottom plate. The mechanism is driven at a rate of 90 cycles per minute by a gear mounted on the outside of the cabinet. The test pieces are 2-inch long T-50 (ASTM D599-55) specimens died from standard stress strain test sheets (ASTM D15-57T). They are mounted by placing the ends in radial slots milled into the edges of circular plates of the racks. The tab ends fit into circumferential grooves machined into the outer surfaces of the plates.

The stress relaxation method is based on the principle that the effective cross-sectional area of a small test piece of rubber is reduced by ozone cracking. The extent of cracking in a test piece is determined by measuring the forces required to extend the test piece 100% before and after exposure to ozone. The ozone concentration for the test is 25 parts ozone/100 million parts air. As the strip begins to crack, the number of stress supporting rubber chains decreases and the force required to extend the strip 100% is reduced. The ratio of this force to the original force is calculated at approximately 16-hour intervals of exposure to ozone. The graph of force vs. time is essentially a straight line and the time required for obtaining 90%, 80% and 70% respectively of the original force is determined from the graph. The ability of the rubber to resist ozone attack is evaluated by comparison of these times to times for suitable controls to reach corresponding percent of the original force. The percents of original moduli of the rubber test pieces are listed as percent retention in the Table infra and the times to reach those retentions are recorded. Longer times indicate better ozone resistance of the rubber stock. The intermittent test comprises 2-hour cycles during which the specimens are exposed dynamically 15% of the time and during the remainder of the time are exposed statically at 25% strain.

The test stock is a typical formulation of styrenebutadiene copolymer rubber. On the basis of 100 parts rubber, all parts being by weight, it comprises:

| | |
|---|---|
| Styrene-butadiene copolymer rubber (SBR 1500) | 100 |
| Carbon black (HAF) | 50 |
| Zinc oxide | 4 |
| Stearic acid | 2 |
| Hydrocarbon oil processing aid | 10 |
| Sulfur | 1.75 |
| Morpholinothiobenzothiazole | 1 |
| Antidegradant (where present) | 2 |

Stock 1 is a control stock containing no antidegradant. Stock 2 contains symmetrical N,N'-di(1,3-dimethylbutyl)-p-phenylenediamine. Stock 3 contains the new N-1,3-dimethylbutyl-N'-1,4-dimethylpentyl-p-phenylenediamine. Stock 4 contains 1 part each of N,N'-di(1,3-dimethylbutyl)-p-phenylenediamine and N,N'-di(1,4-dimethylpentyl)-p-phenylenediamine. Stock 5 contains symmetrical N,N'-di(1,4-dimethylpentyl)-p-phenylenediamine. Static ozone tests of only a few of the stocks falls to a 90% level so that the stocks cannot be compared by the aforedescribed method.

TABLE I

| | Stock | | | | |
|---|---|---|---|---|---|
| | 1 | 2 | 3 | 4 | 5 |
| Dynamic ozone resistance: | | | | | |
| 90% retention, hours | 5 | 33 | 36 | 32 | 32 |
| 80% retention, hours | 10 | 47 | 49 | 47 | 44 |
| 70% retention, hours | 16 | 58 | 60 | 58 | 55 |
| Static ozone resistance: | | | | | |
| 90% retention, hours | 3 | >208 | >208 | >208 | 208 |
| Intermittent ozone resistance: | | | | | |
| 90% retention, hours | 2 | 29 | 33 | 31 | 28 |
| 80% retention, hours | 7 | 42 | 46 | 44 | 41 |
| 70% retention, hours | 11 | 54 | 57 | 56 | 52 |

Skin tests on typical rubber compositions containing N-1,3-dimethylbutyl-N'-1,4-dimethylpentyl-p-phenylenediamine as the major antidegradant indicates that they are safe to use being comparable to control compositions preserved with p-phenylenediamine antiozonants known from long experience to be safe to use.

In general, the antidegradant of this invention is valuable for the preservation of sulfur-vulcanizable diene rubbers. Those containing more than 50% diene hydrocarbon are preferred. The group of rubbers includes natural rubbers, styrene-butadiene copolymer rubber and the various stereospecific polymerized dienes, for example, cis-polybutadiene and cis-polyisoprene. The compositions are also useful in diene rubbers of low unsaturation such as butyl rubber and ethylenepropylene-diene terpolymer rubber (EPDM). The amount to use will vary depending upon the particular formulation and the purpose of the compounder but, in general, the amounts will fall within the range of 0.1 to 5% of the rubber content.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. N-1,3-dimethylbutyl-N'-1,4-dimethylpentyl-p-phenylenediamine.

* * * * *